(12) United States Patent
Kim et al.

(10) Patent No.: US 10,748,190 B2
(45) Date of Patent: Aug. 18, 2020

(54) APPARATUS FOR MANAGING CUSTOMER INFORMATION, METHOD FOR MANAGING CUSTOMER INFORMATION, SYSTEM FOR MANAGING CUSTOMER INFORMATION AND NON-TRANSITORY COMPUTER READABLE STORAGE MEDIUM HAVING A COMPUTER PROGRAM RECORDED THEREON

(71) Applicant: SK PLANET CO., LTD., Seongnam-si, Gyeonggi-do (KR)

(72) Inventors: Cheol Su Kim, Seoul (KR); Min Kyo Shin, Seoul (KR); Hwa Yeon Lee, Seoul (KR); Hee Jeong Kim, Seoul (KR)

(73) Assignee: SK Planet Co., Ltd., Seongnam-Si, Gyeonggi-do (KR)

( * ) Notice: Subject to any disclaimer, the term of this patent is extended or adjusted under 35 U.S.C. 154(b) by 622 days.

(21) Appl. No.: 14/950,796

(22) Filed: Nov. 24, 2015

(65) Prior Publication Data
US 2016/0203524 A1    Jul. 14, 2016

(30) Foreign Application Priority Data
Jan. 9, 2015    (KR) .................. 10-2015-0003134

(51) Int. Cl.
*G06Q 30/02*    (2012.01)

(52) U.S. Cl.
CPC ..... *G06Q 30/0269* (2013.01); *G06Q 30/0261* (2013.01)

(58) Field of Classification Search
CPC .................. G06Q 30/0261; G06Q 30/0269
See application file for complete search history.

(56) References Cited

U.S. PATENT DOCUMENTS

| | | | | |
|---|---|---|---|---|
| 2003/0065805 A1* | 4/2003 | Barnes, Jr. | ............. | G06Q 10/02 709/231 |
| 2009/0164284 A1* | 6/2009 | Koiso | ................ | G06K 9/00335 705/7.29 |

(Continued)

OTHER PUBLICATIONS

"Bar at Bastille" Available at: https://web.archive.org/web/20141210112255/http://www.bastillerestaurant.com/Bar-At-Bastille.html). (Year: 2014).*

*Primary Examiner* — Katherine Kolosowski-Gager
(74) *Attorney, Agent, or Firm* — Fenwick & West LLP

(57) ABSTRACT

Provided are an apparatus for managing customer information, a method for managing customer information, a system for managing customer information, and a non-transitory computer readable storage medium having a computer program recorded thereon. That is, customer identification information may be transmitted to a customer managing apparatus through a customer identification information receiving apparatus positioned in the store. The customer managing apparatus may transmit customer management information corresponding to the customer identification information to a store managing apparatus in the store and user equipment of a clerk. The customer may be managed in the store based on the customer management information. Therefore, it is possible to indirectly acquire customer information from the customer and properly provide required information to the customer.

8 Claims, 6 Drawing Sheets

(56) References Cited

U.S. PATENT DOCUMENTS

2011/0093339 A1* 4/2011 Morton .......... G06Q 30/02
705/14.58
2011/0199486 A1* 8/2011 Moriya .......... G06Q 30/02
348/150

* cited by examiner

APPARATUS FOR MANAGING CUSTOMER INFORMATION, METHOD FOR MANAGING CUSTOMER INFORMATION, SYSTEM FOR MANAGING CUSTOMER INFORMATION AND NON-TRANSITORY COMPUTER READABLE STORAGE MEDIUM HAVING A COMPUTER PROGRAM RECORDED THEREON

CROSS-REFERENCE TO RELATED APPLICATION

This application claims the benefit of Korean Application No. 10-2015-0003134 filed on Jan. 9, 2015 with the Korean Intellectual Property Office, the disclosure of which is incorporated herein by reference.

BACKGROUND OF THE INVENTION

1. Field of the Invention

The present invention relates to an apparatus for managing customer information, a method for managing customer information, a system for managing customer information, and a non-transitory computer readable storage medium having a computer program recorded thereon, and more particularly, to an apparatus for managing customer information, a method for managing customer information, a system for managing customer information, and a non-transitory computer readable storage medium having a computer program recorded thereon for managing customers based on customer identification information acquired when the customers visit a store.

2. Description of the Related Art

With the development of mobile communication technology, wireless devices such as a cellular phone or a personal digital assistant (PDA) have rapidly increased and services which had been performed in the wired Internet have also been changed to wireless Internet based services.

As a wireless network is activated, various services using a lot of wireless networks are provided even in commercial and service fields. A method for managing a customer based on a network and mobile (M) commerce which is mobile electronic commerce is one example of wireless network based commerce services. The M-commerce means a financial transaction associated with various information, services, and goods, which is performed based on a mobile communication device and a communication network. The mobile electronic commerce is a primary service which makes a transaction to be interactively performed at any time and anywhere when customers and providers need the transaction. The M-commerce has attracted the attention as next-generation business and thereafter, a scale of a market based on the M-commerce will be expanded. In recent years, a lot of mobile shopping content providers provide various types of services in order to provide a convenient product search service to a user.

Various services based on the wireless network for the M-commerce and the commerce are provided to the user. The user can acquire information on an article or a service provided by an enterprise or a seller through a user terminal thereof. Further, it is possible to more easily manage the user (alternatively, customer) than ever before based on the wireless network service.

SUMMARY OF THE INVENTION

An object of the present invention is to provide an apparatus for managing product information, a method for managing product information, a system for managing product information, and a non-transitory computer readable storage medium having a computer program recorded thereon for providing information on a purchasable product on an offline by a user based on a position of the user.

Another object of the present invention is to provide an apparatus for managing product information, a method for managing product information, a system for managing product information, and a non-transitory computer readable storage medium having a computer program recorded thereon for providing payment amount information on different products for each user based on personal payment information of the user.

Yet another object of the present invention is to provide an apparatus for managing product information, a method for managing product information, a system for managing product information, and a non-transitory computer readable storage medium having a computer program recorded thereon for providing an optimal route for purchasing a product on the offline by the user based on the position of the user.

According to an aspect of the present invention, an apparatus for managing a customer, the apparatus includes: a customer management information generating unit configured to receive customer identification information of the customer from a customer identification information receiving apparatus implemented in a store and generate customer management information corresponding to the customer identification information; a customer management information storing unit configured to store the customer management information generated by the customer management information generating unit; and a product/service information providing unit configured to generate information on a product/service to be provided to the customer based on the customer management information.

Preferably, the customer identification information receiving apparatus may receive the customer identification information from user equipment of the customer to transfer the received customer identification information to the customer management information generating unit, and the customer identification information receiving apparatus may be one of a Bluetooth apparatus, a near field communication (NFC) apparatus, and a quick response (QR) code recognizing apparatus.

Preferably, the customer management information may include information about a menu of food which have been eaten when the customer visits the corresponding store, a food price, a food image, a customer's food evaluation, an image photographing the customer in the store (alternatively, an image photographed by the customer in the store), and the like.

Preferably, the apparatus may analyze information on an interest product of the customer by periodically tracking a position of the customer after the customer visits the store to provide the interest product as information for generating the customer management information.

Preferably, the image analyzing unit may divide an area of the store into a plurality of subregions and determine the interest product based on whether the customer is positioned in any subregion among the plurality of subregions for a predetermined time or more.

Preferably, the position of the customer may be tracked based on feature information of the image of the customer, and the image analyzing apparatus may first analyze a movable position of the customer by considering a cycle of tracking the position of the customer.

Preferably, the customer management information generating unit may group the plurality of customers to at least one customer group when the store entrance times of the plurality of customers and the store exit times of the plurality of customers are the same as each other in a predetermined time range, respectively.

According to another aspect of the present invention, a method for managing a customer, the method includes: receiving customer identification information of the customer from a customer identification information receiving apparatus implemented in a store and generating customer management information corresponding to the customer identification information; mapping and storing the customer management information with the customer identification information; and providing information on a product/service to the customer based on the customer management information.

Preferably, the method may further include analyzing information on an interest product of the customer by periodically tracking a position of the customer after the customer visits the store to provide the information on the interest product as the customer management information by means of an image analyzing unit, in which the image analyzing unit divides an area of the store into a plurality of subregions and determines the interest product based on whether the customer is positioned in any subregion among the plurality of subregions for a predetermined time or more, the position of the customer is tracked based on feature information of the image of the customer, and the position of the customer is tracked by first analyzing a movable position of the customer by considering a cycle of tracking the position of the customer.

Preferably, the method may further include grouping and managing the plurality of customers to at least one customer group when the store entrance times of the plurality of customers and the store exit times of the plurality of customers are the same as each other in a predetermined time range, respectively.

According to yet another aspect of the present invention, a computer program executing the methods according to the aforementioned embodiments may be stored in a non-transitory computer readable storage medium having a computer program recorded thereon.

According to still another aspect of the present invention, a system for managing a customer, the system includes: a customer managing apparatus configured to receive customer identification information of the customer from a customer identification information receiving apparatus implemented in a store, generate customer management information corresponding to the customer identification information, map and store the customer management information to the customer identification information, and provide information on a product/service to be provided to the customer based on the customer management information; an image analyzing unit configured to divide an area of the store into a plurality of subregions and determine information on the interest product of the customer based on whether the customer is positioned in any subregion among the plurality of subregions for a predetermined time or more to transmit the information on the interest product to the customer managing apparatus as information for generating the customer management information; and user equipment configured to provide the customer identification information to the customer identification information receiving apparatus and receive the information on the product/service from the customer managing apparatus.

According to the embodiment of the present invention, it is possible to perform customer management based on identification information of a customer when the customer visits a store. In addition, it is possible to indirectly acquire customer information from the customer and properly provide required information to the customer.

Further, it is possible to allow the customer to receive a customer service considering personal information from a store based on the customer management information.

Further, it is possible to increase sales by performing various events and advertisements based on the customer management information in the store.

DETAILED DESCRIPTION OF THE PREFERRED EMBODIMENTS

Figure 1:
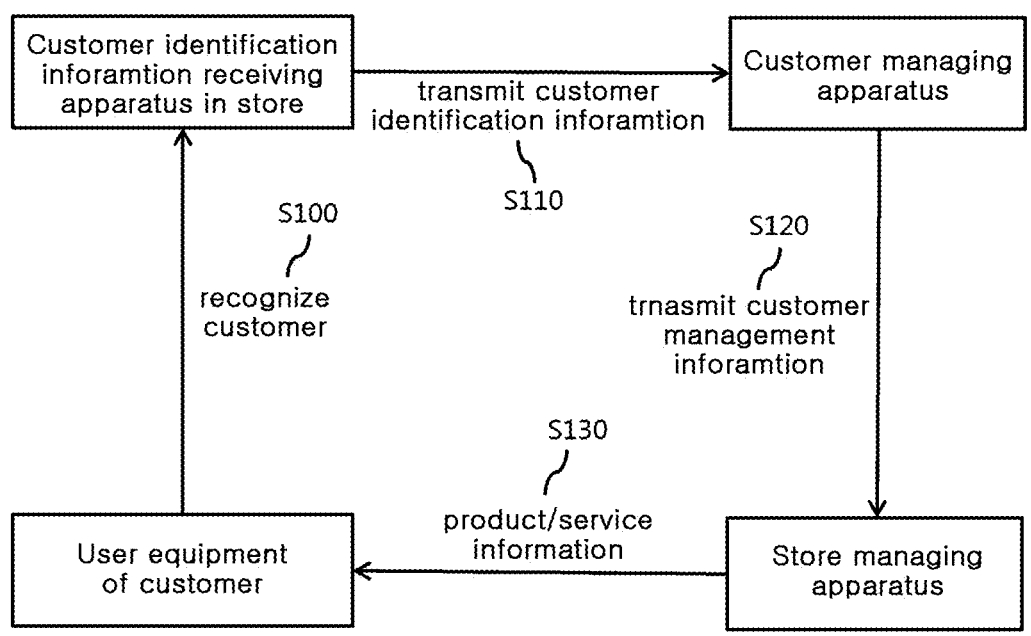
FIG. 1 is a conceptual diagram illustrating a method for managing a customer based on a network according to an embodiment of the present invention.

It is noted that technical terms used in the present invention are used to just describe a specific embodiment and do not intend to limit the present invention. Further, if the technical terms used in the present invention are not particularly defined as other meanings in the present invention, the technical terms should be appreciated as meanings generally appreciated by those skilled in the art and should not be appreciated as excessively comprehensive meanings or excessively reduced meanings. Further, when the technical term used in the present invention is a wrong technical term that does not accurately express the spirit of the present invention, the technical term should be understood by being substituted by a technical term which can be correctly understood by those skilled in the art. In addition, a general term used in the present invention should be interpreted as defined in a dictionary or contextually, and should not be interpreted as an excessively reduced meaning.

In addition, singular expressions used in the present invention include plurals expressions unless they have definitely opposite meanings. In the present invention, it should not analyzed that a term such as "comprising" or "including" particularly includes various components or various steps disclosed in the specification and some component or some steps among them may not included or additional components or steps may be further included. In addition, terms including ordinal numbers, such as 'first' and 'second', used in the present invention can be used to describe various components, but the components should not be limited by the terms. The above terms are used only to discriminate one component from the other components. For example, a first component may be named a second component and similarly, the second component may also be named the first component, without departing from the scope of the present invention.

Hereinafter, preferable exemplary embodiment of the present invention will be described in more detail with reference to the accompanying drawings. Like reference numerals refer to like elements for easy overall understanding and a duplicated description of like elements will be omitted.

Further, in the following description, a detailed explanation of known related technologies may be omitted to avoid unnecessarily obscuring the subject matter of the present invention. Further, it is noted that the accompanying drawings are only for easily understanding the spirit of the present invention and it should not be interpreted that the spirit of the present invention is limited by the accompanying drawings.

Currently, in many commerce systems, when a customer pays a product or a service, a payment history is stored in a point of sales (POS) of a store. However, information on the customer may not be mechanically recognized. Accordingly, for customer management, a separate process of inputting or inquiring customer information is required. A proper response is required by properly recognizing the customer visiting the store for the customer management. However, recognition for the current customer depends on only a memory of a store owner or a clerk.

For customer management based on the customer information, it is necessary to respond to the customer by acquiring the customer information from the customer so that the customer does not have resistance to acquiring and using the customer information. Hereinafter, in an embodiment of the present invention, a method of acquiring customer information based on a network and providing a network-based customer service responding to customers based on the acquired customer information will be described in detail.

FIG. 1 is a conceptual diagram illustrating a method for managing a customer based on a network according to an embodiment of the present invention.

Referring to FIG. 1, the customer may be recognized (step S100).

The customer may be a customer visiting a store for purchasing a product or a customer visiting the store for receiving a service. In order to recognize the customer visiting the store, various methods may be used. For example, the customer visiting the store may receive a piece of identification information for identifying the customer. The identification information may be a quick response (QR) code, identification information based on near field communication (NFC), or identification information based on Bluetooth. The identification information may be stored in user equipment of the customer, and the identification information of the customer may be transmitted to a customer managing apparatus through a customer identification information receiving apparatus positioned in the store.

For example, when the store is a restaurant, the identification information of the customer may be acquired at the entrance of the store or a table on which the customer sits. At the entrance of the store or the table on which the customer sits, a network apparatus for acquiring the identification information of the customer may be positioned. For example, a Bluetooth apparatus, an NFC apparatus, a QR code recognition apparatus, or the like is positioned in the store to receive the customer identification information from the user equipment of the customer.

The customer identification information acquired from the user equipment is transmitted to the customer managing apparatus (step S110).

The customer identification information may be transmitted to the customer managing apparatus through the customer identification information receiving apparatus of the store. The customer managing apparatus may store and manage personal information of the customer corresponding to the customer identification information, information related with a past purchase history of the customer, information on a recommended product/service for the customer, and the like. The information corresponding to the customer identification information managed and stored by the customer managing apparatus may be expressed as a term of customer management information.

For example, when the store is a restaurant, the customer management information may include information about a menu of food which have been eaten when the customer visits the corresponding store, a food price, a food image, a customer's food evaluation, an image photographing the customer in the store (alternatively, n image photographed by the customer in the store), and the like.

The customer management information may be transmitted to a store managing apparatus such as a server of each store (alternatively, a POS system of each store) visited by the customer from the customer managing apparatus (step S120).

Hereinafter, an apparatus such as a server installed in each individual store to receive the customer management information from the customer managing apparatus may be expressed as a term for the store managing apparatus. The customer management information may be directly transmitted to the user equipment of the store owner and/or the clerk through the store managing apparatus or from the customer managing apparatus.

That is, when the customer visits the store, the customer identification information is transmitted to the customer managing apparatus through the customer identification information receiving apparatus, and the customer managing apparatus may transmit the customer management information corresponding to the customer identification information to the store managing apparatus of each store or the user terminal of the store clerk.

Only when the customer agrees to provide the customer management information to the store managing apparatus, the customer managing apparatus may transmit the customer management information to the store managing apparatus.

Information for providing the product or the service is transmitted to the user equipment (step S130).

The information for providing the product or the service may include information on a product which may be purchased by the customer in the store, and information on a service which may be received by the customer in the store. For example, the information for providing the product or the service may include information on a recommended product and a recommended service.

When the store is a restaurant servicing the food, the information for providing the product or the service may include recommended menu information. The recommended menu may be determined by various methods. As described above, the customer managing apparatus may determine a recommended menu for the customer by considering information on a menu which has been previously ordered by the customer, information on a menu to be ordered by other customers, and the like.

Further, the recommended menu may be selected in the store itself. The recommended menu may be determined in the store managing apparatus in real time by considering a food ingredient state in the store, an order history of different users in the store, or the like.

The customer may receive information on a product or a service which may be provided from the customer managing apparatus or the store managing apparatus based on the customer management information like step S130 or may also separately receive information on a product or a service.

For example, when the store is a restaurant, the information on the providable product or service transmitted to the user equipment may be information on the food menu. For example, a QR code for acquiring the information on the food menu may be positioned at a table in the store and a counter of the store. The customer may acquire the information on the food menu providable in the store by reading the QR code through the user equipment. Further, the customer may acquire information on the recommended menu provided in the store based on the QR code.

When the method of managing the customer is used, a personal information protection function may be reinforced by managing personal information such as a purchase history of the customer and an individual taste of the customer in the customer managing apparatus other than the store. Further, the customer may receive information on a product or a service which is suitable for the taste of the customer based on the same customer information even when visiting the stores at various positions. Difficulty of selection of the product or the service of the customer may be reduced by providing information on the recommended product or the recommended service to the customer.

Further, a customized product or service may be provided to the customer by reflecting the personal information of the customer in the store and information on the customer may be rapidly and easily acquired through computerized customer management.

Figure 2:
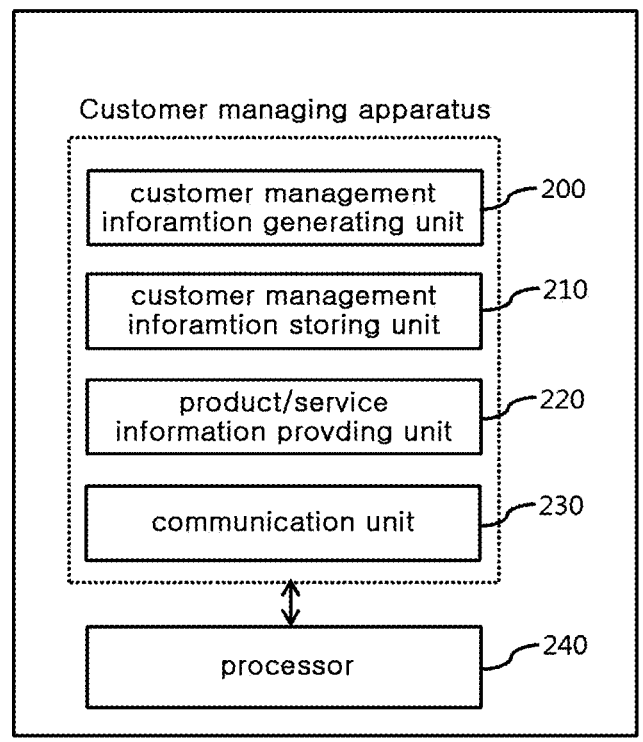
FIG. 2 is a block diagram illustrating an apparatus of managing a customer according to the embodiment of the present invention.

FIG. 2 is a block diagram illustrating an apparatus of managing a customer according to the embodiment of the present invention.

Referring to FIG. 2, the apparatus of managing the customer may include a customer management information generating unit 200, a customer management information storing unit 210, a product/service information providing unit 220, a communication unit 230, and a processor 240.

The customer management information generating unit 200 may be implemented by receiving the customer identification information from the customer identification information receiving apparatus and receiving information related with the customer (information on a product purchased by the customer, information on a service provided to the customer, personal information of the customer, and the like) from the store managing apparatus to generate customer management information for customer management. When the generated customer management information exists, the customer management information generating unit may be implemented to perform an additional update for the customer management information.

The customer management information storing unit 210 may be a database storing the customer management information generated by the customer management information generating unit 200. The customer management information storing unit 210 may be implemented to store the customer identification information and the customer management information corresponding to the customer identification information.

The product/service information providing unit 220 may be implemented to provide information on a product and a service to be recommended to a specific customer based on the customer management information or information on the product or the service providable in the store.

The communication unit 230 may be implemented to receive customer identification information of the customer and information related with the customer for generating the customer management information from the store managing apparatus and provide the information on the product/service to the user equipment.

The processor 230 may be implemented to control operations of the customer management information generating unit 200, the customer management information storing unit 210, the recommended product/service information providing unit 220, and the communication unit 230.

Figure 3:
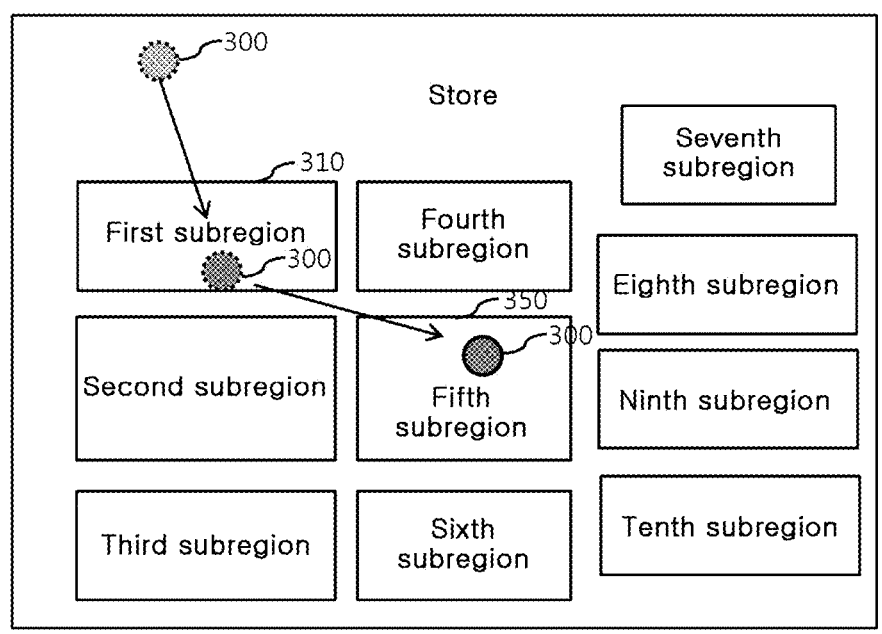
FIG. 3 is a conceptual diagram illustrating a method of acquiring customer management information in the apparatus of managing the customer according to the embodiment of the present invention.

FIG. 3 is a conceptual diagram illustrating a method of acquiring customer management information in the apparatus of managing the customer according to the embodiment of the present invention.

In FIG. 3, a method of acquiring the customer management information based on image information photographed in the store by the apparatus of managing the customer information is illustrated.

Referring to FIG. 3, when a customer 300 visits the store, the customer 300 may search an interest product in the store. In this case, the customer 300 may be positioned at a predetermined position in the store where the interest product is displayed for a relatively long time.

An entrance of the customer 300 is recognized based on the customer identification information in the store and the position of the customer 300 in the store may be determined. For example, the customer identification information receiving apparatus may recognize the identification information of the customer 300, and an image pickup apparatus in the store may periodically or continuously track a movement of the customer in the store by matching the identification information of the customer 300 with the customer 300 entering the store. A method of tracking the movement of the customer will be described below.

When the movement of the customer is tracked, the interest product of the customer 200 may be analyzed based on the image photographed in the image pickup apparatus. For example, in the case where it is determined that the customer 300 spends a relatively long time at a position where sport shoes are displayed in the store, the interest product of the customer 300 may be determined as the sport shoes.

In order to search the interest product of the customer 300, an area in the store may be divided into a plurality of subregions corresponding to the displayed products. A product corresponding to a subregion in which the customer 300 stays for a predetermined time or more may be determined as the interest product of the customer. The image analysis may be performed in the store managing apparatus, the customer managing apparatus, or a separate image analyzing unit.

For example, the area of the store may be divided into a first subregion 310 to a tenth subregion and a product sold in each subregion may correspond to each subregion. When the customer stays in the first subregion 310 and the fifth subregion 350 in the store for a predetermined time or more, the product positioned in each of the first subregion 310 and the fifth subregion 350 may be determined as the interest product of the customer.

The product purchased among the products determined as the interest product of the customer may be excluded from the interest product.

The customer managing apparatus may target and transmit advertisement information on the interest product of the customer to the user equipment of the customer. An efficient advertisement may be performed by targeting an advertisement for the interest product of the customer using the method.

Figure 4:
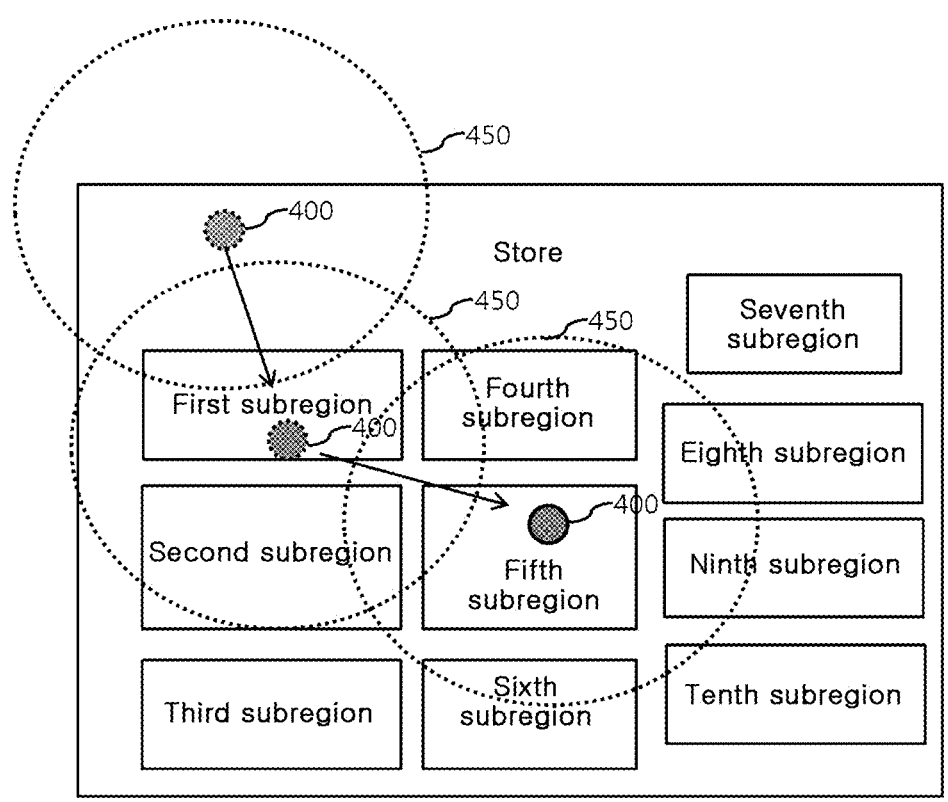
FIG. 4 is a conceptual diagram illustrating a method of tracking movement of the customer according to the embodiment of the present invention.

FIG. 4 is a conceptual diagram illustrating a method of tracking movement of the customer according to the embodiment of the present invention.

In FIG. 4, a method of analyzing a position of a customer 400 according to the movement of the customer 400 in the store and determining a corresponding relation between the position of the customer 400 and a divided store area is illustrated. In FIG. 4, a method of tracking a movement of the customer 400 through a separate image analyzing apparatus and determining interest product information of the customer 400 is illustrated. However, the movement of the customer 400 may be analyzed in a different apparatus such as the customer managing apparatus instead of the separate image analyzing apparatus.

Referring to FIG. 4, customer identification information may be allocated to the customer 400 which is initially recognized in the image analyzing apparatus positioned in the store. The image analyzing apparatus may extract feature information of the customer 400 through image analysis and match the identification information of the customer with the feature information.

The image analyzing apparatus may determine a current position of the customer 400 through periodic analysis for the received image. The image analyzing apparatus may determine the current position of the customer 400 based on the feature information of the customer 400 extracted from the received image in advance.

In order to determine the current position of the customer 400, the image analyzing apparatus may first searches a movable area 450 of the customer by considering an image analysis cycle to determine the position of the customer 400. If there is no customer 400 in the movable area 450, the image analyzing apparatus may determine the position of the customer 400 through image analysis for the entire area of the store.

For example, when the image analysis cycle is three seconds, the area 450 in which the customer 400 is averagely movable within three seconds may be a primary search area of the image analyzing apparatus. As the image analyzed result, if the position of the customer 400 is not determined, it may be determined that the customer 400 is positioned at a dead zone of the current image pickup apparatus or the customer 400 goes out of the store.

The image analyzing apparatus may determine a time when the customer 400 stays at a specific position by the above tracking method. As the tracked result, when it is determined that the customer 400 stays at the specific position for a predetermined time or more, the product corresponding to the position of the customer 400 may be determined as the interest product of the customer 400.

Figure 5:
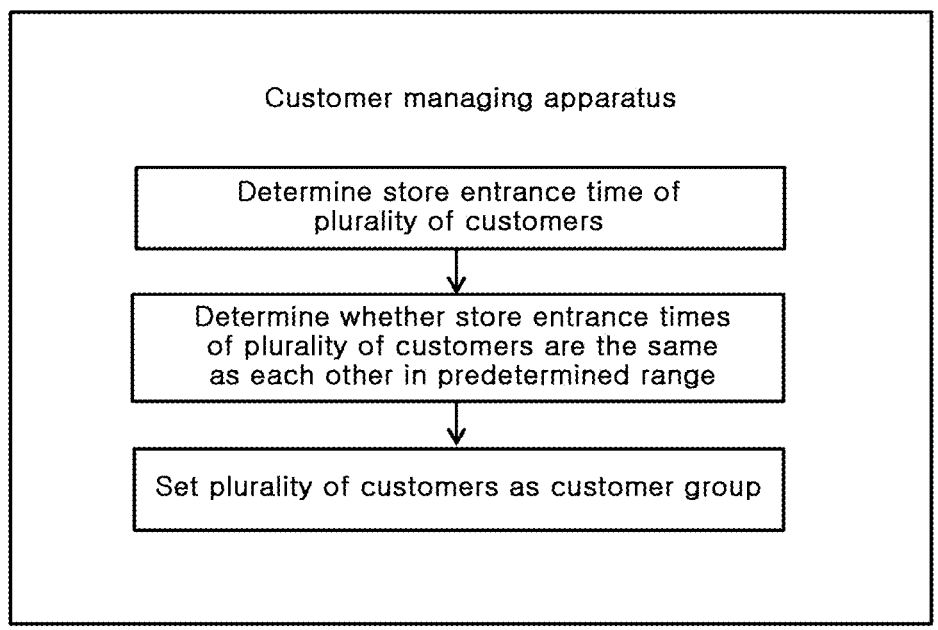
FIG. 5 is a conceptual diagram illustrating a method of managing customer information according to another embodiment of the present invention.

FIG. 5 is a conceptual diagram illustrating a method of managing customer information according to another embodiment of the present invention.

In FIG. 5, a method of performing customer management by grouping a plurality of customers based on identification information of each of the plurality of customers which visit the store is illustrated.

Referring to FIG. 5, when the store is a restaurant, the visit between family members, between friends, and between colleagues may exist. That is, the plurality of customers may visit the store by a group unit.

In this case, the customer managing apparatus may set a customer group by grouping the plurality of customers based on identification information of the plurality of customers transmitted through the customer identification information receiving unit implemented in the store. The customer managing apparatus may manage customer information by a customer group unit. It is assumed that the customer identification information receiving unit is installed at an entrance of the store.

For example, the customer managing apparatus may group the plurality of customers by considering a time when the plurality of customers goes into the store and a time when the plurality of customers goes out of the store. That is, when the times when the plurality of customers goes into the store are the same as each other in a predetermined range and the times when the plurality of customers goes out of the store are the same as each other in a predetermined range, the plurality of customers may be set as one customer group unit. In detail, the customer managing apparatus may determine whether store entrance times of the plurality of customers and store exit times of the plurality of customers are the same as each other in a predetermined time range (for example, one minute), respectively, based on the customer identification information received through a customer identification information receiving unit. When the store entrance times of the plurality of customers and the store exit times of the plurality of customers are the same as each other in the predetermined time range (for example, one minute), respectively, the plurality of customers may be determined as one customer group unit.

As another example, the plurality of customers may be grouped by considering whether the plurality of customers is positioned on the same table in the store. When the customer identification information receiving unit is positioned on the table, the customer identification information receiving unit positioned on one table may receive identification information of the plurality of customers within a predetermined time range (for example, 10 minutes). The plurality of customers corresponding to the identification information of the plurality of customers received in the predetermined time range may be determined as one customer group unit.

Information on the customer group unit may be continuously updated. For example, first, when only a mother and a father among family members visit, a customer group unit including only the mother and the father may be formed. Thereafter, when children in addition to the mother and the father among the family members additionally visit, the pre-formed customer group unit may be updated to a unit including the children.

According to the embodiment of the present invention, the customer managing apparatus may mange the customer information based on the customer group unit. One customer may be included in several customer group units. The customer managing apparatus may provide a separate recommended product and a separate recommended service for each customer group unit. Further, advertisement information and event information requesting the visit for each customer group unit may be provided.

Figure 6:
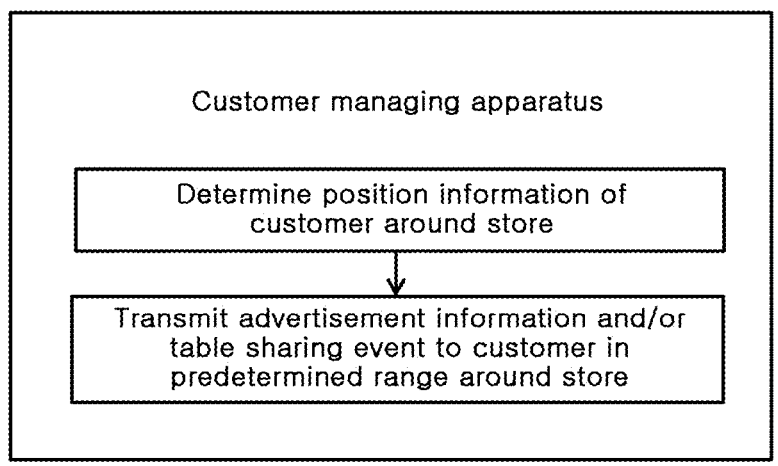
FIG. 6 is a conceptual diagram illustrating a method of advertising a store based on the customer information according to the embodiment of the present invention.

FIG. 6 is a conceptual diagram illustrating a method of advertising a store based on the customer information according to the embodiment of the present invention.

In FIG. 6, when the customer information additionally includes position information of the customer, a method of providing advertisement information to customers around the store is illustrated.

When the customer agrees to provide the position information of the customer as the customer information, the advertisement information may be provided to the customers around the store.

For example, a product may be provided to the customers at a discount within a limited time in a store on offline. The discount information may be provided to the user equipment of the customers existing at a predetermined position around the store. The store managing apparatus may transmit discount event information of the store to the customer managing apparatus. The customer managing apparatus may transmit the discount event information of the store to the user equipment of the customers existing at a predetermined position around the store.

Alternatively, in the case of a store selling the food, when the customer shares a different table from another customer, the food may be provided at a discount. For example, site information of the store may be continuously updated in the store selling the food. If there is an available site for providing the food, a table sharing event for the corresponding site may be performed. For example, when a customer visiting alone eats on a table for four, a clerk of the restaurant asks for agreement on whether to share the table on which another customer eats by using the corresponding table together to the eating customer. When the table sharing is performed, both the existing customer and the customer visiting at a table sharing event may receive the food at a discount.

When the existing customer agrees on the table sharing, the store managing apparatus may request that the table sharing event is advertised to the customers around the store to the customer managing apparatus. The table sharing event may be transmitted to only the user equipment of the customer positioned at a place which may visit the corresponding store within 5 minutes.

The customer managing apparatus may advertise the table sharing event of the corresponding store to the user equipment of the customers positioned around the store by considering the position information of the customer. A customer which intends to visit the corresponding store as the table sharing event among the customers receiving the advertisement information on the table sharing event may reserve the visit. When the customer which intends to visit the corresponding store as the table sharing event visits the corresponding store within a predetermined time (for example, 5 minutes) after the visit reservation, the customer may receive the food at the discount applying the table sharing event.

The apparatus for managing the customer information, the method for managing the customer information, the system for managing the customer information according to the embodiment of the present invention may be prepared with a computer program, and codes and code segments configuring the computer program may easily deduced by a computer programmer in the art. Further, the corresponding computer program is stored in a non-transitory computer readable storage medium, and read and executed by the computer or the apparatus for managing the customer information, the store managing apparatus, the user equipment, and the like according to the embodiment of the present invention to implement the method for managing the customer information.

The non-transitory computer readable storage medium includes a magnetic storage medium, an optical storage medium, and a carrier wave medium. The computer programs implementing the apparatus for managing the customer information, the method for managing the customer information, the system for managing the customer information according to the embodiment of the present invention may be stored and installed in embedded memories of the user equipment and the like. Alternatively, external memories such as a smart card storing and installing the computer programs implementing the apparatus for managing the customer information, the method for managing the customer information, the system for managing the customer information according to the embodiment of the present invention may be installed in the user equipment and the like through an interface.

According to the embodiment of the present invention, it is possible to perform customer management based on identification information of a customer when the customer visits a store and indirectly acquire customer information from the customer and properly provide required information to the customer. Therefore, it is possible to allow the customer to receive a customer service considering personal information from a store based on the customer management information and increase sales by performing various events and advertisements based on the customer management information in the store.

Hereinabove, although the present invention is described by specific matters such as concrete components, and the like, embodiments, and drawings, they are provided only for assisting in the entire understanding of the present invention. Therefore, the present invention is not limited to the embodiments. Various modifications and changes may be made by those skilled in the art to which the present invention pertains from this description. Therefore, the spirit of the present invention should not be limited to the above-described embodiments and the following claims as well as all modified equally or equivalently to the claims are intended to fall within the scope and spirit of the invention.

What is claimed is:

1. An apparatus for managing a customer, the apparatus comprising:
   a memory; and
   a processor configured to execute instructions stored in the memory and to:
   capture an image of the customer when the customer enters a store serving food;
   receive customer identification information of the customer from a customer identification information receiving apparatus implemented in the store, wherein the customer identification information receiving apparatus is configured to receive the customer identification information of a plurality of customers when the plurality of customers are in a predetermined location in the store for a predetermined amount of time;
   generate customer management information corresponding to the customer identification information;
   group the plurality of customers as a specific customer group based on the customer identification information of the plurality of customers;
   store the customer management information;
   analyze the captured image of the customer;
   identify the customer by matching the analysis of the captured image of the customer with the received customer identification information;

track periodically a position of the customer after the customer is identified;

set a movable area of a typical customer based on an image analysis period, wherein the movable area of the typical customer is a movement range of the typical customer within the store for the predetermined amount of time;

determine the position of the customer based on an image analysis of the movable area of the typical customer when the customer is found within the set movable area of the typical customer;

determine the position of the customer based on an image analysis of an entire area of the store when the customer is not found within the set movable area of the typical customer;

determine an interested product of the customer based on the position of the customer;

generate information corresponding to recommended menu information on food items served at the store based on the customer management information; and responsive to receiving approval from the customer to provide the position of the customer, provide a table sharing event to user equipment of other customers positioned in the store serving food.

2. The apparatus of claim 1, wherein the customer identification information receiving apparatus receives the customer identification information from user equipment of the customer to transfer the received customer identification information to the customer management information generator, and the customer identification information receiving apparatus is one of a Bluetooth apparatus, a near field communication (NFC) apparatus, and a quick response (QR) code recognizing apparatus.

3. The apparatus of claim 2, wherein the customer management information comprises at least one of:
information about a menu of food that the customer chooses in the store;
a food price;
a food image;
a customer's food evaluation;
an image capturing the customer in the store; or
an image captured by the customer in the store.

4. The apparatus of claim 1, wherein the processor is further configured to:
divide an area of the store into a plurality of subregions; and
determine a product located within a predetermined distance of a specific subregion as an interested product of the customer when the customer is positioned in the specific subregion for a predetermined amount of time.

5. The apparatus of claim 1, wherein the processor is configured to group the plurality of customers to at least one specific customer group when store entrance times of the plurality of customers and store exit times of the plurality of customers are within a predetermined range.

6. A method for managing a customer, the method comprising:
capturing an image of the customer when the customer enters a store serving food;
receiving, by a customer management information generator, customer identification information from a customer identification information receiving apparatus implemented in the store, wherein the customer identification information receiving apparatus is configured to receive the customer identification information of a plurality of customers when the plurality of customers are in a predetermined location in the store for a predetermined amount of time;

generating, by the customer management information generator, customer management information corresponding to the customer identification information;

mapping, by a customer management information storage, the customer management information with the customer identification information;

storing, by the customer management information storage, the customer management information;

analyzing the captured image of the customer by an image analyzer;

identifying, by the image analyzer, the customer by matching the analysis of the captured image of the customer with the received customer identification information;

tracking periodically a position of the customer after the customer is identified;

setting, by the image analyzer, a movable area of a typical customer based on an image analysis period, wherein the movable area of the typical customer is a movement range of the typical customer within the store for the predetermined amount of time;

determining, by the image analyzer, the position of the customer based on image analysis of the movable area of the typical customer when the position of the customer is found within the set movable area of the typical customer;

determining, by the image analyzer, the position of the customer based on an image analysis of an entire area of the store when the customer is not found within the set movable area of the typical customer;

determining an interested product of the customer based on the position of the customer;

providing, by a product/service information provider, information corresponding to recommended menu information on food items served at the store to a user device of the customer based on the customer management information;

grouping and managing, by the customer management information generator, the plurality of customers as a specific customer group based on the customer identification information of the plurality of customers; and responsive to receiving approval from the customer to provide the position of the customer, providing a table sharing event to user equipment of other customers positioned in the store serving food.

7. The method of claim 6, wherein the method further comprises:
grouping and managing the plurality of customers to at least one specific customer group when store entrance times of the plurality of customers and store exit times of the plurality of customers are within a predetermined range.

8. A system for managing a customer, the system comprising:
a memory:
a processor configured to execute instructions stored in the memory and to:
capture an image of the customer when the customer enters a store serving food:
receive customer identification information of the customer from a customer identification information receiving apparatus implemented in the store, wherein the customer identification information receiving apparatus is configured to receive the customer identification information of a plurality of customers when the plurality of customers in a predetermined location in the store for a predetermined amount of time;

generate customer management information corresponding to the customer identification information;

map the customer management information with the customer identification information;

store the customer management information;

provide information corresponding to a product/service available for the customer to a user device of the customer based on the customer management information;

group the plurality of customers as a specific customer group based on the customer identification information of the plurality of customers;

analyze the captured image of the customer;

identify the customer by matching the analysis of the captured image of the customer with the received customer identification information;

track periodically a position of the customer after the customer is identified;

set a movable area of a typical customer based on an image analysis period, wherein the movable area of the typical customer is a movement range of the typical customer within the store for the predetermined amount of time;

determine a position of the customer based on an image analysis of the movable area of the typical customer when the customer is found-within the set movable area of the typical customer;

determine the position of the customer based on an image analysis of an entire area of the store when the customer is not found within the set movable area of the typical customer;

divide an area of the store into a plurality of subregions;

determine information corresponding to an interested product of the customer based on whether the customer is positioned in a specific subregion for a predetermined amount of time; and transmit the information corresponding to the interested product of the customer to the customer managing apparatus for generating the customer management information, wherein the information corresponding to the interested product is recommended menu information on food items served at the store;

responsive to receiving approval from the customer to provide the position of the customer, provide a table sharing event to user equipment of other customers positioned in the store serving food; and the user device configured to:

provide the customer identification information to the customer identification information receiving apparatus; and receive the recommended menu information available for the customer from the customer managing apparatus.

* * * * *